United States Patent Office 3,640,952
Patented Feb. 8, 1972

3,640,952
POLYESTERURETHANES STABILIZED WITH
IMINO-OXAZINES
Sidney H. Metzger, Jr., Leverkusen-Neuenhof, Germany, assignor to Mobay Chemical Company, Pittsburgh, Pa.
No Drawing. Original application Mar. 2, 1966, Ser. No. 531,093, now Patent No. 3,479,351, dated Nov. 18, 1969. Divided and this application June 11, 1969, Ser. No. 832,421
Int. Cl. C08g 51/60
U.S. Cl. 260—45.8 NZ
6 Claims

ABSTRACT OF THE DISCLOSURE

Polyester based polymeric compositions are stabilized against hydrolysis by adding to said polyester based polymeric compositions a stabilizing amount of a tetrahydro-1,3-oxazine. The preferred tetrahydro-1,3-oxazines have the formula

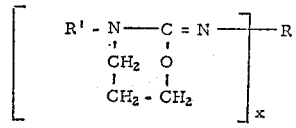

wherein R and R' are selected from the group consisting of aliphatic, cycloaliphatic or aromatic radicals and $x$ is 1 or 2.

---

This application is a division of application Ser. No. 531,093 filed Mar. 2, 1966 and now U.S. Pat. No. 3,479,-351.

This invention relates to tetrahydro oxazines, particularly to tetrahydro-1,3-oxazines, more particularly to tetrahydro-2-imino-1,3-oxazines and to the stabilization of ester-containing compositions therewith.

Heretofore it has been recognized in an article entitled "Anlagerungsrecktionen mit Epoxyden" by Klaus Gulbins and Karl Hamann, Berichte, Volume 94, page 3287 (1961), that the reaction of 1,2-alkylene oxide with a carbodiimide should be expected to result in the formation of iminooxazolidines. This article, however, points out that this is not the case and iminooxazolidines do not result due to the fact that they are unstable and are converted immediately to cyclic ureas.

In addition, various organic materials, particularly polyesters, are decomposed in the presence of oxygen and moisture. Some of the products resulting from the hydrolysis of polyesters in the presence of moisture are acid materials which, in turn, accelerate further decomposition of the polyesters.

Since the polyurethanes prepared from polyesters and polyisocyanates are useful as coatings, foams and elastomers, it is essential that products normally resulting from the hydrolysis of these polyesters in the presence of moisture be substantially eliminated. It has been suggested that various stabilizers such as carbodiimides may be incorporated in polyesters and polyurethanes, to retard the formation of these hydrolytic products.

Therefore, it is an object of this invention to provide a method for preparing organic oxazine derivatives. It is another object of this invention to provide a method for stabilizing polyesters against hydrolysis. It is still another object of this invention to provide a method for stabilizing compositions containing polyesters against hydrolysis. It is a further object of this invention to provide a polyester composition stabilized against hydrolysis. It is a still further object of this invention to provide coatings, foams and elastomers containing stabilizers which have improved age and weather resistant properties. A still further object of this invention is to provide polyurethanes which are resistant to deterioration.

The foregoing objects and others which will become apparent from the following description are accomplished in accordance with the invention, generally speaking, by providing a method for preparing tetrahydro oxazine derivatives having the formula

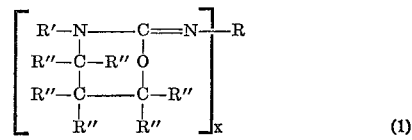

wherein R is the residue obtained by removing at least one NCO group from an organic isocyanate, R' is an organic group having from 1 to 15 carbon atoms, R" which may be the same or different, is either hydrogen, halogen or organic groups having from 1 to 10 carbon atoms and $x$ is an integer equal to the number of NCO groups removed from R.

Examples of organic groups such as, aliphatic, cycloaliphatic, and aromatic groups represented by R and R' above are alkyl, aryl or cycloalkyl radicals, of which phenyl, α-naphthyl, β-naphthyl, α-anthryl, β-anthryl, γ-anthryl: o-tolyl, m-tolyl, p-tolyl, 2,3-xylyl, 2,4-xylyl, 2,5-xylyl, 2,6-xylyl, 3,4-xylyl, 3,5-xylyl, o-cumenyl, m-cumenyl, p-cumenyl, mesityl, o-ethylphenyl, m-ethylphenyl, p-ethylphenyl, o-, m- and p-tertiary butylphenyl, 2,6-ditertiary butylphenyl, o-, m- and p-ethoxyphenyl, o-, m- and p-tert. butoxyphenyl and the like, are examples of aryl radicals. Alkyl radicals are, for example, methyl, ethyl, n-propyl, isopropyl, n-butyl, isobutyl, sec-butyl, tert.butyl, n-pentyl and various positioned isomers thereof, such as, for example, 1-methylbutyl, 2-methylbutyl, 3-methylbutyl, 1,1-dimethylpropyl, 1,2-dimethylpropyl, 2,2-dimethylpropyl, 1-ethylpropyl and the like; corresponding straight and branched chain isomers of hexyl, heptyl, octyl, nonyl, decyl, undecyl, dodecyl, tridecyl, tetradecyl, hexadecyl and the like. Examples of cycloalkyl radicals which may be employed are, cyclopropyl, cyclobutyl, o-, m- and p-isopropyl cyclohexyl, o-, m- and p-tert.butyl cyclohexyl, cycloheptyl, cyclooctyl, cyclononyl, cyclodecyl, cycloundecyl, cyclododecyl and the like.

In other words, the invention relates to a process for preparing tetrahydro-1,3-oxazine derivatives having the above formula by reacting carbodiimides or polymeric carbodiimides with trimethylene oxide or derivatives of trimethylene oxide at a temperature of from about 50° C. to about 250° C., preferably from about 150° C. to about 200 C. in the presence of a catalyst. Even though a solvent is not essential to this reaction, it is preferred that the reaction be conducted in the presence of an inert organic solvent.

Polycarbodiimides having the following representative formula

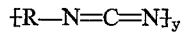

wherein R is a bivalent organic radical and $y$ is an integer greater than 1, may be reacted with 1,3-alkylene oxides such as trimethylene oxide or derivatives of trimethylene oxide to form polymeric tetrahydro-1,3-oxazines.

Organic diisocyanates which may be uesd in the formation of the polymeric carbodiimides include toluene 2,4-diisocyanate, m-phenylene diisocyanate, 4-chloro-1,3-phenylene diisocyanate, 4,4'-biphenylene diisocyanate, 1,5-naphthalene diisocyanate, tetramethylene diisocyanate, decamethylene diisocyanate, 1,4-cyclohexylene diisocyanate, 4,4'-methylene-dicyclohexylene diisocyanate and 1,5-tetrahydronaphthylene diisocyanate. Mixtures of two or more of these organic diisocyanates may be used, in which case the bivalent organic radical R in the above formula will not be the same in each recurring unit. It is also to be understood that isocyanate-terminated polymers may be used to form these carbodiimides, in which case the carbodiimide will have more than 15 carbon atoms and the substantially linear polymers will have a plurality of intralinear carbodiimide linkages. Here again, it is to be understood that mixtures of two or more different isocyanate-terminated polymers may be used, in which case the bivalent organic radical R in the above formula will not be the same in each recurring unit.

Likewise, compounds containing more than two free isocyanate groups may also be used in the formation of polymers containing a plurality of carbodiimide linkages. In this case, the resulting organic carbodiimide will be a high molecular weight, substantially cross-linked polymer. Representative compounds containing more than two free isocyanate groups, which may be used include 2,4,6-triisocyanato toluene p-isocyanatophenyl-2,4-diisocyanatophenyl ether, and compounds which are prepared from trifunctional reactants. It is readily apparent that any of a wide variety of organic compounds containing more than two free isocyanate groups may be used in the formation of compounds having polycarbodiimide linkages.

Although a solvent is not essential in the preparation of tetrahydro oxazines from the reaction of a carbodiimide with trimethylene oxide or substituted trimethylene oxide, it is preferred that the reaction be conducted in the presence of an inert organic solvent. Solvents which may be employed are for example aliphatic, cycloaliphatic, or aromatic hydro carbons, preferably those with 5 to 16 carbon atoms such as, heptane, isooctane, cyclohexane, benzene, toluene or halogenated hydrocarbons, containing from 1 to 10 carbon atoms, for example, carbon tetrachloride, chloroform, ethylene chloride, trichlorofluoromethane, tetrachloroethane, chlorobenzene, trichlorobenzene fluorobenzene or open or cyclic ethers, such as, dioxane, tetrahydrofuran, dibutyl ether, dimethyltetrahydrofuran or dialkyl ethers of ethylene glycol and dialkyl ethers of diethylene glycol and so forth. It is preferred that dioxane, tetrahydrofuran or dialkyl ethers of ethylene glycol and dialkyl ethers of diethylene glycol be employed as solvents in the formation of these oxazines.

Although it is not essential, it is highly preferred that a suitable catalyst be used in carrying out this reaction and that the reaction be maintained at a temperature less than about 250° C. for a period of from 1 to 8 hours, preferably from 1 to 3 hours.

Catalysts which may be used to accelerate the formation of the tetrahydro oxazines are, for example, tertiary amines, including N,N-dimethylaniline, 1-methyl-4(dimethylaminoethyl)piperazine, N-ethyl ethenylidine, N,N,N',N'-tetramethyl ethylene diamine, triethyl amine, 2,4,6-tri(dimethylaminomethyl)benzene, N-ethyl morpholine, 2-methyl-piperazine and the like; alkali metal hydroxides including sodium hydroxide, potassium hydroxide, lithium hydroxide and the like; tetraethyl ammonium bromide and the like. It is preferred that the trialkyl amine catalysts be used.

It is to be understood that the particular amount of catalyst used will depend to a large extent on the reactivity of the specific catalyst. Since these catalysts accelerate the formation of the tetrahydro oxazines from carbodiimides and trimethylene oxide, catalytic amounts of these catalysts should be used, such as 0.01 to 35.0 parts of catalyst per 100 parts of carbodiimide.

Any suitable carbodiimide may be used in the practice of this invention to prepare tetrahydro oxazines such as, for example, diisopropyl carbodiimide, dicyclohexyl carbodiimide, methyl tertiary-butyl carbodiimide, tertiary butyl phenyl carbodiimide, tetramethylene-bis-diisobutyl carbodiimide, N-dimethyl amino propyl tertiary butyl carbodiimide, the monoglycol ether of hydroxyphenyl-tertiary butyl carbodiimides, diphenyl carbodiimide,
dinaphthyl carbodiimide,
2,2'-dimethyl-diphenyl carbodiimide,
2,2'-diisopropyl-diphenyl carbodiimide,
2-dodecyl-2'-n-propyl-diphenyl carbodiimide,
2,2'-diethoxy-diphenyl carbodiimide,
2-dodecyl-2'-ethyldiphenyl carbodiimide,
2,2'-dichloro-diphenyl carbodiimide,
2-ethyl-2'-isopropyl-diphenyl carbodiimide
2,6,2',6'-tetraethyl-diphenyl carbodiimide,
2,6,2',6'-tetraethyl-3,3'-dichloro diphenyl carbodiimide,
2,6,2',6'-tetrasecondary-butyl-diphenyl carbodiimide,
2,6,2',6'-tetraisopropyl-3,3'-dinitro-diphenyl carbodiimide,
2-ethyl-cyclohexyl-2-isopropyl-phenyl carbodiimide,
2,4,5,2',4',6'-hexaisopropyl-diphenyl carbodiimide,
2,2'-diethyl-dicyclohexyl carbodiimide,
2,6,2',6'-tetraisopropyl dicyclohexyl carbodiimide,
2,6,2',6'-tetraethyl-dicyclohexyl carbodiimide and
2,2'-dichloro-dicyclohexyl carbodiimide,
2,2'-dicarbethoxy diphenyl carbodiimide,
2,2'-dicyano-diphenyl carbodiimide
and the like.

Any suitable carbodiimide having more than one carbodiimide group may also be used, such as, those described in U.S. Pat. 2,941,966.

The trimethylene oxide or substituted trimethylene oxide may be used in equivalent proportions or in excess of the quantity of the carbodiimide used.

The reactants are inserted into a reaction vessel containing a solvent which is non-reactive with the reactants and the reaction product. The reactants are heated to a temperature of from about 100° C. to about 250° C. and maintained at this temperature for from about 1 to about 3 hours or longer. The reaction mass is then cooled and the product is separated by standard techniques such as crystallization or distillation.

The tetrahydro-1,3-oxazines may be prepared by conventional means starting from γ-hydroxy propyl amine as represented by the following equations:

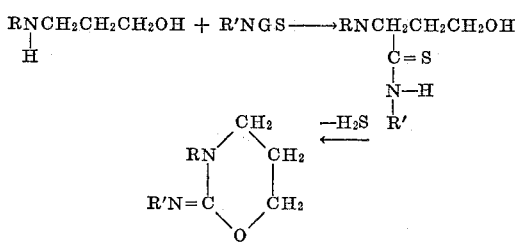

wherein R and R' are organic radicals.

The removal of hydrogen sulfide can be affected according to the J. Am. Chem. Soc. 47, 1981 (1925) and the University of Kansas Science Bulletin vol. 20, No. 6, 161 (1931). Desulfurization agents which may be employed are, for example, mercuric oxide, lead oxide, ethylene chlorohydrin in potassium hydroxide or a mixture of sodium hydroxide and chlorine.

The γ-hydroxy propyl amines may be prepared by a number of conventionally known techniques, for example, those disclosed in the J. Am. Chem. Soc. 42, 1720 (1920), or J. Am. Chem. Soc. 76, 2789 (1954).

Any suitable organic amine may be used in the formation of the γ-hydroxy propyl amines such as, for example, aliphatic and aromatic primary amines which may be defined by the following structural formula:

wherein R represents an aliphatic radical having from 1 to 20 carbon atoms, an aromatic radical having from 6 to 18 carbon atoms, and cycloaliphatic radical having from 5 to 15 carbon atoms as well as substituted aliphatic, aromatic and cycloaliphatic radicals.

Amines which conform to the above are well known in the art. Illustrative of these aliphatic amines are the primary alkyl amines such as methylamine, ethylamine, n-propylamine, isopropylamine, n-butylamine, isobutylamine, sec.-butylamine, tert.-butylamine, amylamine, isoamylamine, 2-aminopentane, n-hexylamine, n-octylamine, n-decylamine, n-dodecylamine, n-tetradecylamine. Illustrative of aromatic amines are aniline, toluidine, 2,4-xylyldine, o-anisidine, p-anisidine and so forth. Illustrative of cycloaliphatic amines are cyclohexyl amine, methylcyclohexyl amine, ethylcyclohexyl amine, propylcyclohexyl amine, butylcyclohexyl amine and so forth. Examples of alkoxy amines are methoxy benzylamine, ethoxybenzylamine, propoxybenzylamine and so forth.

Organic isothiocyanates which may be reacted with amino alcohols are, for example, methyl isothiocyanate, ethyl isothiocyanate, propyl isothiocyanate, isopropyl isothiocyanate, allyl isothiocyanate, butyl isothiocyanate, isobutyl isothiocyanate, sec.-butyl isothiocyanate, tert.-butyl isothiocyanate, amyl isothiocyanate, 3-methoxypropyl isothiocyanate, tetradecyl isothiocyanate, chlorodecyl isothiocyanate, dodecyl isothiocyanate, hexadecyl isothiocyanate, octadecyl isothiocyanate, 1-isothiocyanato-octadecene-9, phenyl isothiocyanate, cyclohexyl isothiocyanate, o-chlorophenyl isothiocyanate, m-chlorophenyl isothiocyanate, p-chlorophenyl isothiocyanate, o-toluyl isothiocyanate, m-tolyl isothiocyanate, p-toluyl isothiocyanate, o-ethylphenyl isothiocyanate, o-ethoxyphenyl isothiocyanate, p-ethoxyphenyl isothiocyanate, 2,4-dichlorophenyl isocyanate, α-naphthyl isothiocyanate, β-naphthyl isothiocyanate, o-biphenyl isothiocyanate, o-phenoxyphenyl isothiocyanate and the like.

Among the polyisothiocyanates which are useful are, for example, trimethylene diisothiocyanate, hexamethylene diisothiocyanate, butylene-1,3-diisothiocyanate, propylene-2,2-diisothiocyanate, cyclohexylene - 1,2-diisothiocyanate, 1,4-phenylene diisothiocyanate, methylene-bis-4-phenyl diisothiocyanate, ethylene tetraisothiocyanate and the like.

New derivatives of previously prepared tetrahydro-1,3-oxazines may be synthesized by an interchange reaction as illustrated by the following general equations:

be used in the interchange reaction. The organic isocyanates and corresponding isothiocyanates contemplated herein, are for example, methyl isocyanate, ethyl isocyanate, propyl isocyanate, isopropyl isocyanate, allyl isocyanate, butyl isocyanate, isobutyl isocyanate, sec.-butyl isocyanate, tert.-butyl isocyanate, amyl isocyanate, 3-methoxypropyl isocyanate, tetradecyl isocyanate, chlorodecyl isocyanate, dodecyl isocyanate, hexadecyl isocyanate, octadecyl isocyanate, 1 - isocyanato-octadecene-9, phenyl isocyanate, cyclohexyl isocyanate, o-chlorophenyl isocyanate, m-chlorophenyl isocyanate, p-chlorophenyl isocyanate, o-toluyl isocyanate, m-toluyl isocyanate, p-toluyl isocyanate, o-ethylphenyl isocyanate, o-ethoxyphenyl isocyanate, p-ethoxyphenyl isocyanate, 2,4-dichlorophenyl isocyanate, α-naphthyl isocyanate, β-naphthyl isocyanate, o-biphenyl isocyanate, o-phenoxyphenyl isocyanate and the like. Among the polyisothiocyanates which are useful are, for example, trimethylene diisocyanate, hexamethylene diisothiocyanate, butylene-1,3-diisothiocyanate, methylene-bis-4-phenyl diisocyanate, ethylene tetraisothiocyanate and the like.

The interchange reactions may take place in the absence of a solvent; however, it is preferred that the reaction be conducted in the presence of an organic solvent which is inert to the oxazines and the isocyanates. Examples of suitable inert organic solvents are benzene, hexane, xylene, toluene, naphthalene, dioxane, cyclohexane, carbon tetrachloride, nitrobenzene, chlorobenzene and the like.

The tetrahydro - 2-imino-1,3-oxazines are particularly useful in the stabilization of ester containing compositions and may be incorporated therein by any suitable technique, such as dissolving in the ester composition, or adding to one of the reactants before they react with the esters. In the event the polyester is reacted with organic polyisocyanates to form polyurethanes, the ozazines

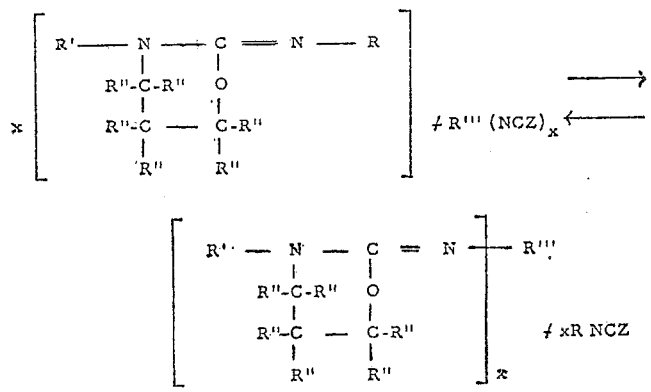

wherein R, R' and R'' are the same as defined in Formula 1; R''' may be aliphatic, cycloaliphatic or aromatic, Z is a divalent radical selected from the group consisting of oxygen and sulfur and x is an integer of from 1 to 4.

Where interchange reactions occur when using the tetrahydro-1,3-oxazines as stabilizing agents in polymeric systems employing isocyanates, it is particularly advantageous to first prepare derivatives by the above interchange reaction in order to remove RNCZ, where RNCZ is so volatile that it may be obnoxious or dangerously toxic.

Since this reaction results in an equilibrium condition, it is necessary that the isocyanate thus formed or isothiocyanate (RNCZ) be removed immediately in order to substantially complete the reaction. When polyisocyanates are used and depending on the amount of oxazine present in the mixture, the interchange reaction may take place with one or more of the NCO groups present.

Any suitable organic isocyanate or isothiocyanate may may be added after this reaction takes place in the dissolved state, by rolling, milling, stirring, or any other suitable technique.

Any compound containing ester linkages

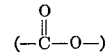

may be stabilized against hydrolytic degradation in accordance with this invention. Thus any ester composition obtained by condensing any organic acid such as acetic acid, propionic acid, phenyl acetic acid, benzoyl acetic acid, pyruvic acid, α-hydromuconic, propionyl acetice acid, levulinic acid, 1,2-keto stearic acid, 1,3-keto behenic acid, aldovaleric acid, hexahydrobenzoic acid, cyclohexane-1,2-dicarboxylic, cyclohexane - 1,4 - dicarboxylic, naphthylene - 1,2 - dicarboxylic, brassylic acid, phenylmalonic acid, ethylglycolic acid, thioglycolic acid. β-chloropropionic acid, glutaconic acid, ethoxymalonic acid, malic acid, aspartic acid, polyacrylic acid, cinnamic acid, benzene tricarboxylic acid, adipic acid, 6-amino caproic acid, succinic acid, suberic acid, sebacic acid, oxalic acid, methyladipic acid, glutaric acid, pimelic acid, azelaic acid, phthalic acid, terephthalic acid, isophthalic acid, malonic acid, maleic acid, fumaric acid, citraconic acid, itaconic acid, etc. with alcohols, such as methyl alcohol, ethyl alcohol, propyl alcohol, isopropyl alcohol, n-butyl alcohol, isobutyl alcohol, secondary butyl alcohol, tertiary butyl alcohol, amyl alcohol, hexyl alcohol, octyl alcohol, decyl alcohol, lauryl alcohol, myristyl alcohol, cetyl alcohol, stearyl alcohol, allyl alcohol, methallyl alcohol, crotyl alcohol, 2-propyn-1-ol, oleyl alcohol, geraniol, citronellol, linalool, diacetone alcohol, ethylene glycol monoethyl ether, cyclohexanol, naphthenic alcohols, benzyl alcohol, tolyl alcohol, phenylethyl alcohol, octadecylbenzyl alcohol, ethylene glycol, propylene glycol, 1,4 - butanediol, 1,3 - butanediol, 1,5-pentanediol, 1,6-hexanediol, bis-(hydroxymethyl)-cyclohexane, diethylene glycol, 2,2 - dimethyl propylene glycol, 1,3,6 - hexanetriol, trimethylol propane, pentaerythritol, sorbitol, glycerine and the like. The method of stabilizing compositions containing ester groups is applicable not only to monoesters but also to polyesters in accordance with the compounds listed above having a functionality greater than 1. For example, where any of the di- or polycarboxylic acids are reacted with the di- or polyhydric alcohols, a polyester having more than one ester group, of course, will result.

Other compositions containing polyester resins as a reactive component or in admixture can also be stabilized by the process of this invention. For example, compositions such as polyester amides and polyester urethanes can be stabilized. The reaction product of any of the carboxy terminated or hydroxyl terminated esters set forth above can be reacted with a suitable isocyanate to prepare a polyurethane. In the preparation of polyesteramides, the reaction of a carboxylic acid, an alcohol and an amine can be carried out simultaneously or in steps in the manner set forth for the preparation of polyesteramides. Amino alcohols and amino acids can be used in the preparation of polyesteramides. The important feature is, however, that any composition containing ester groups can be stabilized against hydrolysis by the introduction thereof of a tetrahydro oxazine within the formula set forth above.

Any suitable organic polyisocyanate may be used to prepare polyester urethanes which may be stabilized in accordance with this invention, such as, for example, those more particularly set forth above.

Any suitable amino compound can be used to prepare polyesteramides such as, for example, hexamethylene diamine, ethylene diamine, propylene diamine, butylene diamine, cyclohexylene diamine, phenylene diamine, tolylene diamine, xylylene diamine, 4,4' - diamino-diphenylmethane, naphthylene diamine, aminoethyl alcohol, aminopropyl alcohol, aminobutyl alcohol, aminobenzyl alcohol, aminoacetic acid, aminopropionic acid, aminobutyric acid, aminovaleric acid, aminophthalic acid, aminobenzoic acid and the like. Of course, the amino compounds may be reacted either simultaneously with the ester forming components or sequentially therewith.

It is also within the scope of this invention that naturally occurring esters may be stabilized against hydrolysis and aging in accordance with this invention such as, for example, castor oil, coconut oil, corn oil, cottonseed oil, horse fat oil, lard oil, wool fat, Japan wax, mutton tallow, beef tallow, neat's foot oil, palm oil, peanut oil, carnauba wax, spermaceti, beeswax, rapeseed oil, soya bean oil, whale oil, sperm oil and the like. Further, any compositions containing ester groups as well as unsaturation may be stabilized in accordance with this invention. Such compositions may be formed by polymerization, condensation or a combination of both. Any of these unsaturated carboxylic acids mentioned above may be used in the preparation of such polyesters. Further examples of such compositions include polyester resins of polymerizable monomers and unsaturated polyesters, for example, those of fumaric or maleic acid as well as ethylene vinyl ester copolymers, acrylic and methacrylic acid ester polymers and/or their copolymers with vinyl esters, fluorinated acrylic esters and their copolymers, copolymers of acrylonitrile and acrylic acid esters such as methylacrylate and the like. The invention is particularly applicable to the stabilizaton of polyesters used in the manufacture of synthetic resins which may result in the form of lacquers, foils and coatings, fibers, foam materials, elastomers or casting resins for molded elements.

Any of the tetrahydro oxazines within the generic formula set forth above may be used to stabilize any of the polyester compositions described herein. The tetrahydro oxazines should be used in a stabilizing amount, however. It is preferred that an amount of 0.005 to about 10 parts per 100 parts of polyester be used.

The invention is further illustrated but not limited by the following examples in which parts and percentages are by weight unless otherwise specified.

EXAMPLE 1

Preparation of tetrahydro-2-phenylimino-3-phenyl-1,3-oxazine

About 97 parts (0.5 mol) of diphenylcarbodiimide are added to an autoclave containing about 206 parts of dioxane, about 18 parts of triethylamine and 34.8 parts (0.6 mol) of trimethylene oxide. The reaction mass is heated to a temperature between about 160° and 180° C. and maintained at this temperature for 5 hours. After cooling the dioxane is removed by vacuum distillation and the resulting product is recrystallized from isopropyl alcohol. The product is identified by infra-red spectrum as tetrahydro-2-phenylimino-3-phenyl-1,3-oxazine.

EXAMPLE 2

A mixture of about 484 parts (5.2 mols) of aniline, 246 parts (2.6 mols) of 1-chloro-3-propanol and 250 parts of anhydrous sodium carbonate is added to a reactor and refluxed for from 3 to 4 hours. The reaction product is filtered and the residue washed with ether. The filtrate is distilled and after the excess aniline is removed a viscous lemon-colored liquid is recovered which turns red on standing. This product boils at a temperature of about 192° C. under 30 mm. pressure which is identified as γ-hydroxypropyl aniline. Approximately 302 parts (2 mols) of the γ-hydroxypropyl aniline is reacted with approximately 270 parts (2.0 mols) of phenylisothiocyanate in approximately 310 parts of dry dioxane. The reaction temperature increased to about 50° C. and upon standing the product crystallized. These crystals are separated from the reaction mass by filtration, dried and identified as diphenyl-hydroxypropylthiourea. Approximately 330 parts (1.29 mols) of this thiourea is mixed with about 616 parts of dry benzene containing approximately 419 parts of mercuric oxide with agitation. The reaction mass is heated to boiling and the water distilled off as an azetropic mixture with benzene and collected to determine when the reaction is substantially complete. The solvent is removed in vacuo and the product is recrystallized from isopropyl alcohol. The product obtained is identical to that obtained in Example 1.

EXAMPLE 3

A stainless steel autoclave, equipped with an agitator, is charged with about 316 parts of dioxane, 206 parts (1 mol) of dicyclohexyl carbodiimide, about 36 parts of triethylamine and about 69.6 parts (1.2 mols) of trimethylene oxide. The solution is heated with agitation to a temperature of about 175° C. for a period of 5 hours. At the end of this time, the reaction mixture is cooled and transferred to a distillation system where an excess of trimethylene oxide and triethylamine are recovered by fractional distillation. The dioxane is stripped in vacuo and the solid residue recrystallized from isopropyl alcohol. The product is identified by infra-red spectrum as tetrahydro-2-cyclohexylimino - 3 - cyclohexyl - 1,3 - oxazine.

EXAMPLE 4

Into a stainless steel 1-liter stirred autoclave is introduced 141 parts of bis-(p-ethoxyphenyl)-carbodiimide, 204 parts of dry dioxane, 18 parts of triethylamine and 35 parts of trimethylene oxide. The solution is heated with stirring at a temperature of between about 160° and 180° C. for about 5 hours. At the end of this time, the reaction mixture is cooled and transferred to a distilling flask where excess trimethylene oxide and triethylamine are recovered by fractional distillation. The dioxane is then stripped in vacuo and the residue recrystallized from isopropyl alcohol and identified as tetrahydro-2-p-ethoxyphenylimino-3-p-ethoxyphenyl-1,3-oxazine.

EXAMPLE 5

Into a stainless steel 1-liter stirred autoclave is introduced 77 parts of dibutyl carbodiimide, 204 parts of dry dioxane, 18 parts of triethylamine and 35 parts of trimethylene oxide. The solution is heated with stirring at a temperature between about 160 and 180° C. for 5 hours. At the end of this time, the reaction mixture is cooled and transferred to a distilling flask where excess trimethylene oxide and triethylamine are recovered by fractional distillation. The dioxane is stirpped in vacuo and the solid residue is recrystallized from isopropyl alcohol. The crystalline product is identified from infra-red spectrum as tetrahydro-2-butylimino-3-butyl-1,3-oxazine.

EXAMPLE 6

About 20 parts of poly(2,4-tolylene carbodiimide) and about 200 parts of tetrahydrofuran are introduced into a 1-liter stainless steel stirred autoclave along with about 5 parts of triethylamine and about 10 parts of trimethylene oxide. The solution is heated with stirring to a temperature between about 170 and 190° C. for about 5 hours. At the end of this time, the reaction mixture is cooled and transferred to a distillation system, where excess trimethylene oxide, triethylamine and tetrahydrofuran are removed. The residue is identified as a polymeric tetrahydro-1,3-oxazine product of poly(2,4-tolylene carbodiimide).

EXAMPLE 7

Into a 1-liter three neck flask is charged 126 parts (0.5 mol) tetrahydro-2-phenylimino-3-phenyl-1,3-oxazine, 62.5 parts (0.25 mol) of 4,4'-diphenylmethane diisocyanate and 400 parts by volume of dry decalin. The flask is equipped with a thermometer, a mechanical stirrer and a fractionating column with a variable reflux head equipped for vacuum distillation. The exchange reaction is conducted at 100 to 150° C. with agitation, the boiling temperature being controlled by varying the vacuum. Phenyl isocyanate along with some decalin is removed as overhead as the reaction progresses. As soon as no further phenyl isocyanate is evolved, all but approximately 100 parts by volume of the decalin is removed by distillation in vacuo and the reaction mass is allowed to cool. The product which separates as a white solid is filtered and dried in vacuo. From the infra-red spectrum and the elemental analysis, the product is found to have the following structure:

EXAMPLE 8

In the same equipment as Example 7 is charged about 126 parts (0.5 mol) tetrahydro-2-phenylimino-3-phenyl-1,3-oxazine, 43.5 parts of 2,4-toluene diisocyanate and about 400 parts by volume of dry decalin (dried over sodium). The mixture heated to a temperature between 100 and 150° C. with agitation, the boiling temperature being controlled by varying the vacuum. Phenyl isocyanate along with some decalin is removed as overhead as the reaction progresses. As soon as no additional phenyl isocyanate is evolved, all but approximately 100 parts by volume of the decalin is removed by distillation in vacuo. The product which separates out as a solid, is filtered and dried. From infra-red analysis the product is found to have the following structure:

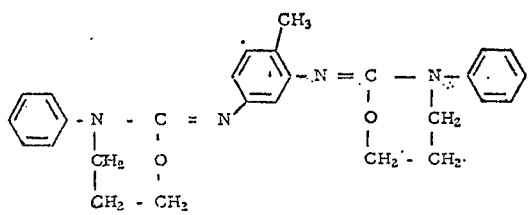

EXAMPLE 9

Approximately 604 parts (4 mols) of γ-hydroxypropyl aniline prepared in accordance with Example 2 is reacted with about 384 parts (2.0 mols) of phenylene diisothiocyanate in about 310 parts of dry dioxane. The reaction temperature is not allowed to go over 50° C. The product crystallized and is sepaarted from the reaction mass by filtration and dried. Approximately 494 parts (1.0 mol) of the product produced above is then mixed with about 616 parts of dry benzene containing about 325 parts of mercuric oxide. The reaction mass is heated to boiling with agitation and the water distilled off as an azeotropic mixture with benzene and collected to determine when the reaction is substantially complete. The reaction product is filtered and the residue washed with hot benzene. The benzene is removed by vacuum distillation and the product is identdified by the conventional analytical techniques and found to have the following formula:

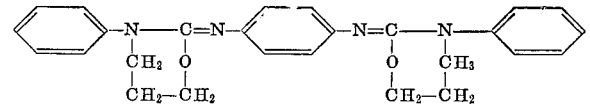

EXAMPLE 10

Approximately 604 parts (4 mols) or γ-hydroxypropyl aniline prepared in accordance with Example 2 is reacted with about 564 parts (2.0 mols) of 4,4'-diisothiocyanatodiphenyl methane in approximately 310 parts of dry dioxane. The reaction temperature is not allowed to go over 50° C. Upon cooling, crystals are formed which are separated from the reaction mass by filtration and dried. Approximately 584 parts (1.0 mol) of the crystalline product obtained above are mixed with about 616 parts of dry benzene containing approximately 325 parts of mercuric oxide. The reaction mass is heated to boiling with agitation and the water distilled off as an azeotropic mixture with benzene and is collected in order to determine when the reaction is complete. The benzene is then removed by vac-

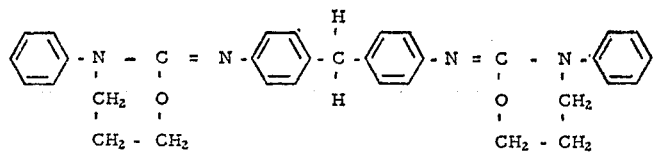

uum distillation, and the resulting product identified by infra-red spectrum and elemental analysis as

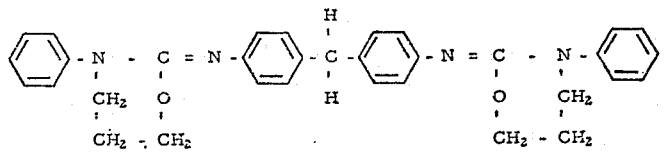

EXAMPLE 11

A solution containing approximately 438 parts (6 mols) of n-butyl amine and about 174 parts (3 mols) of trimethylene oxide and about 75 parts of water are heated in an autoclave at 150° C. for about 18 hours. The crude reaction product is recovered by distillation. After drying over potassium hydroxide pellets the product is redistilled yielding a 3-butylamino-1-propanol, boiling point 106 to 108° C. (16 mm.).

Approximately 262 parts (2 mols) of the 3-butylamino-1-propanol are reacted with about 270 parts (2 mols) of phenylisothiocyanate in about 310 parts of dry dioxane. The reaction temperature is not allowed to rise above 50° C. After cooling the product crystallized and is separated from the reaction mass by filtration and dried. Approximately 262 parts of this crystalline product are mixed with about 600 parts of dry benzene containing about 325 parts of mercuric oxide with agitation. The reaction mass is heated to boiling and the water distilled off as an azeotropic mixture with benzene. The reaction mass is filtered and the precipitate washed with hot benzene. The benzene is removed by vacuum distillation and the resulting product is recrystallized from isopropyl alcohol. The product is identified as tetrahydro-2-phenylimino-3-butyl-1,3-oxazine.

EXAMPLE 12

About 1 part of tetrahydro-2-phenylimino-3-phenyl-1,3-oxazine prepared in accordance with the description of Example 1 is dissolved in about 100 parts of a hydroxyl polyester having a molecular weight of about 2000 and an hydroxyl number of about 57, which is prepared by reacting adipic acid with diethylene glycol and trimethylol propane. About 10 parts of an isomeric mixture of 80 percent 2,4- and 20 percent 2,6-toluylene diisocyanate is added to this mixture which is then cast onto a Teflon coated tray to a thickness of about ⅛ inch where it is permitted to remain for about 2 hours at about 110° C. Identical samples are prepared without the addition of the tetrahydro-2-phenylimino-3-phenyl-1,3-oxazine of Example 1. The polymers are placed on a 1-inch screen over a steam bath at about 100° C. The unmodified polymers softened after a few hours and completely failed after about 5 days. Those containing the additive in accordance with this invention did not soften even after five days of exposure.

In a similar manner the following derivatives of tetrahydro-1,3-oxazines have been incorporated in polyesters with substantially the same results: 2-cyclohexylimino-3-cyclohexyl- 2,p-ethoxyphenylimino-3,p-ethoxyphenyl-, 2-butylimino-3-butyl-1,3-oxazine and polymeric oxazines of poly(2,4-tolylene carbodiimide).

EXAMPLE 13

To baout 100 parts of the polyester of Example 12 are added about 0.67 part of tetrahydro-2-phenylimino-3-phenyl-1,3-oxazine prepared in accordance with Example 1. To this mixture is added about 10 parts of an isometric mixture consisting of about 80 percent 2,4-toluylene diisocyanate and about 20 percent of 2,6-toluylene diisocyanate. The mixture which is one typically used in the prepaartion of printing rollers is cast in to a test sample. The test sample is subjected to steam at 100° C. This sample failed after about 144 hours. In comparison, a similar sample containing none of the additives set forth above failed after about 90 hours.

EXAMPLE 14

The procedure of Example 13 is followed with the exception that approximately 4 parts of the tetrahydro oxazine described in Example 1 is added to about 100 parts of the polyester. A test sample prepared using this stabilized polyester exhibited no signs of failure even after a period of about 144 hours on a steam bath.

EXAMPLE 15

To about 100 parts of the polyester described in Example 12 is added 1.15 parts of a compound having the formula:

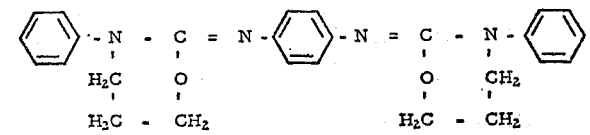

which is then reacted with about 10 parts of an isomeric mixture consisting of about 80 percent 2,4-toluylene diisocyanate and about 20 percent 2,6-toluylene diisocyanate. The reaction mixture which is one typically used in the prepaartion of printing rollers is cast into a test sample. The test sample is subjected to saturated steam at approximately 100° C. This sample appeared to fail after about 144 hours. In comparison, a similar sample containing none of the additive set forth above failed after a little over 90 hours.

EXAMPLE 16

The procedure of Example 15 is followed with the exception that 3.47 parts of the compound having the formula represented in Example 15 is added to the polyester. A test sample prepared using this stabilizer exhibited no signs of failure even after 144 hours on a steam bath.

EXAMPLE 17

To about 100 parts of a hydroxyl terminated polyester obtained from the reaction of about 10 mols of adipic acid and about 11 mols of 1,4-butane diol and having an hydroxyl number of 56 and an acid number less than 1 is added to about 9 parts of 1,4-butane diol and about 40 parts of 4,4'-diphenylmethane diisocyanate. The reaction mixture is immediately cast into a heated plate maintained at a temperature of about 110° C. where it is permitted to solidify. Upon solidification, the material is removed from the plate and tested for elongation, elongation set, tensile and tear strength. The sample is then subjected to steam at 15 pounds per square inch gauge for a period of about 16 hours and then tested again. To each of three 100 part samples of the polyester reacted as above, are added the quantities of the compound of Example 1 indicated in the following table. The test data both before and after the steam test are set forth:

TABLE

| Parts/100 parts polyester | Elongation | | Elongation set | | Tensile | | Tear | |
|---|---|---|---|---|---|---|---|---|
| | Before | After | Before | After | Before | After | Before | After |
| ---------- | 500 | 560 | 10 | 140 | 7,890 | 3,560 | 245 | 220 |
| 0.70_____ | 490 | 560 | 10 | 77 | 7,680 | 4,270 | 216 | 277 |
| 1.40_____ | 500 | 600 | 20 | 115 | 7,620 | 4,280 | 288 | 261 |
| 2.10_____ | 540 | 600 | 40 | 117 | 8,000 | 4,260 | 295 | 214 |

It is of course to be understood that any of the tetrahydro-1,3-oxazines mentioned above may be used in the stabilization of any of the polyesters set forth above. Also, any of the carbodiimides may be used in the preparation of the oxazines in accordance with this invention and may be substituted into the examples for those specifically set forth herein.

Although the invention has been described in considerable detail in the foregoing for the purpose of illustration, it is to be understood that such detail is solely for this purpose and that variations can be made by those skilled in the art without departing from the spirit and scope of the invention.

What is claimed is:

1. A polyester based polymeric composition stabilized against hydrolysis comprising a polyesterurethane and a stabilizing amount of a tetrahydro-1,3-oxazine having the formula

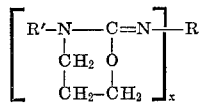

wherein R and R' are selected from the group consisting of $C_1$ to $C_{18}$ alkyl, $C_3$ to $C_{12}$ cycloalkyl and aryl or aryl substituted by lower alkyl, lower alkoxy, halo or phenoxy groups and $x$ is 1 or 2.

2. The stabilized composition of claim 1 wherein from about 0.005 part to about 10 parts of tetrahydro-1,3-oxazine are present per 100 parts of polyester based polymer.

3. The stabilized composition of claim 1 wherein R' is a phenyl radical, R is a phenyl radical and $x$ is 1.

4. The stabilized composition of claim 1 wherein R' is a phenyl radical, R is a divalent phenylene radical and $x$ is 2.

5. The stabilized composition of claim 1 wherein R' is a phenyl radical, R is a divalent diphenylmethane radical and $x$ is 2.

6. The stabilized composition of claim 1 wherein R' is a cyclohexyl radical, R is a cyclohexyl radical and $x$ is 1.

References Cited

UNITED STATES PATENTS

| | | | |
|---|---|---|---|
| 2,817,663 | 12/1957 | Conlon et al. | 260—244 |
| 2,974,120 | 3/1961 | Miller | 260—45.8 |
| 2,995,540 | 8/1961 | Duennenberger et al. | 260—45.8 |
| 3,479,351 | 11/1969 | Metzger, Jr. | 260—246 |

DONALD E. CZAJA, Primary Examiner

R. A. WHITE, Assistant Examiner

U.S. Cl. X.R.

260–2.5 BB, 75 T, 398.5, 468 R